Dec. 19, 1967   C. A. SECKERSON   3,358,551
FASTENERS

Filed Aug. 27, 1965   2 Sheets-Sheet 1

INVENTOR
Clifford Alexander Seckerson
by Philip E. Parker
Attorney.

Dec. 19, 1967  C. A. SECKERSON  3,358,551
FASTENERS

Filed Aug. 27, 1965  2 Sheets-Sheet 2

INVENTOR
Clifford Alexander Seckerson
by. Philip E. Parker
Attorney.

United States Patent Office 3,358,551
Patented Dec. 19, 1967

3,358,551
FASTENERS
Clifford Alexander Seckerson, Iver Heath, Buckinghamshire, England, assignor to United-Carr Incorporated, Boston, Mass., a corporation of Delaware
Filed Aug. 27, 1965, Ser. No. 483,069
Claims priority, application Great Britain, Sept. 9, 1964, 36,925/64
1 Claim. (Cl. 85—80)

ABSTRACT OF THE DISCLOSURE

A fastener for holding a threaded member in a support formed with a part circular aperture having oppositely extending recesses. The fastener includes a tubular shank having two external ribs extending lengthwise thereon which are positioned within the recesses in the support to prevent rotation of the fastener relative to the support. A pair of internal grooves extend into the ribs and allow the shank to be radially collapsed. A flange at one end of the shank has a dished undersurface which presses resiliently against a surface of the support. An external part circumferential groove is formed in the shank adjacent the flange and provides a part annular shoulder facing the flange which cooperates with the flange to securely clamp the fastener to the rim of the support defining the aperture therein.

---

The present invention relates to a resilient fastener for holding a threaded member such as a bolt or screw in an apertured panel and more particularly to a fastener for holding the angle adjustment screw of a vehicle headlamp reflector bowl to a support.

In the automobile industry it is the normal practice to attach the reflector bowl of a vehicle headlamp to an annular support flange by three threaded bolts or screws. The screws are held against axial movement but are free to rotate relative to the bowl and their rearwardly projecting ends are threadedly engaged in apertures in the annular support. Thus, the angle of the bowl can be adjusted relative to the support by rotating any one of the screws and threading it into or out of its receiving aperture in the support.

In order to achieve the necessary angular adjustment of the bowl the screws have to be tilted to a substantial extent out of the vertical relative to the support and this is liable to damage the thread on the screw or, if a resilient bush is used to retain the screw in the aperture in the support, it is liable to damage the bush or lift the bush out of the aperture.

It is an object of the present invention to provide a fastener which is suitable for use as a bush or anchor nut for vehicle headlamp reflector bowl adjustment screws and which obviates or substantially reduces the above described problems.

According to the invention there is provided a resilient fastener for holding a threaded member in an apertured panel, the fastener comprising a tubular shank which is internally plain-walled and externally non-circular and adapted for insertion into a complementary non-circular aperture in the said panel so as to be non-rotatable therein, a flange at one end of the shank having a dished undersurface adapted to press resiliently against a surface of the panel and an external part-circumferential groove in the shank adjacent the shank forming a part-annular shoulder facing the flange and adapted to co-operate with the flange in clamping the rim of the apertured panel, in which the shank is internally plain walled prior to insertion of the threaded member into thread cutting engagement in the shank and in which the flange is sufficiently dished and resilient to allow substantial angular movement of the threaded member away from the vertical relative to the panel.

Figure 1:
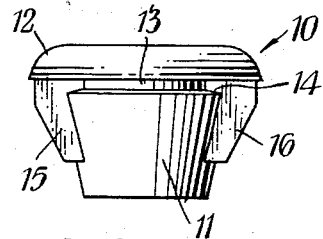
Figure 2:
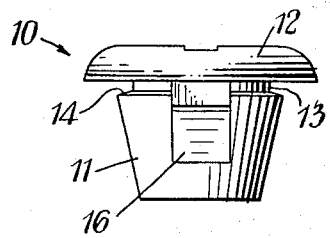
Figure 3:
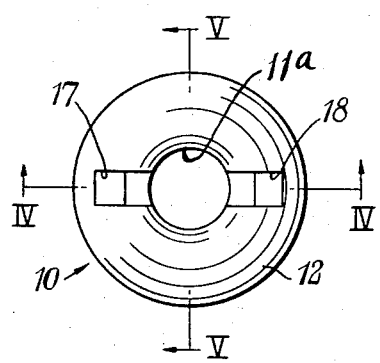
Figure 4:
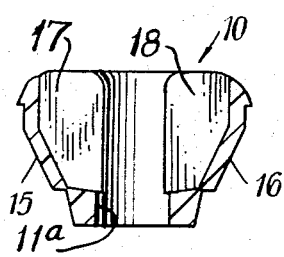
Figure 5:
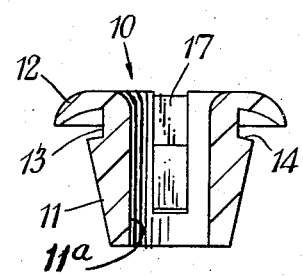
Figure 6:
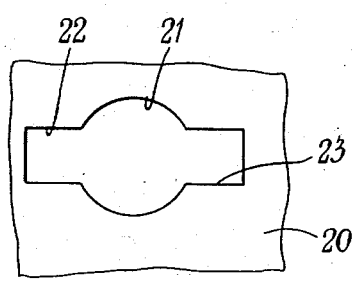

Preferred forms of the invention will now be described with reference to the accompanying drawings in which:

FIGURES 1, 2 and 3 are respectively a front elevation, side elevation and plan view of a fastener, FIGURES 4 and 5 are sections taken on the lines IV—IV and V—V of FIGURE 3, FIGURE 6 is a plan view of a portion of a panel having an aperture shaped to receive the fastener of FIGURES 1 to 5, FIGURE 7 is an elevation, partly in section showing a screw held to an apertured support panel by the fastener of FIGURES 1 to 5, FIGURE 8 shows a modified form of screw attached in the fastener of FIGURES 1 to 5, FIGURE 9 is a part-sectional elevation showing a modification of the fastener of FIGURES 1 to 5, and FIGURES 10 and 11 are respective an elevation and underplan of a further modification of the fastener of FIGURES 1 to 5.

In FIGURES 1 to 5 a resilent fastener is indicated generally at 10 which is formed by injection moulding from a synthetic plastics material and preferably from an acetyl resin such as a polypropylene.

The fastener 10 comprises a tubular shank 11 which is externally non-circular in cross-section and which has a flexible, annular flange 12 at one end. As best shown in FIG. 5, the flange 12 is dished and concave on the side adjacent to the shank 11 and when the shank is inserted in an aperture in a support the flange 12 is adapted to make a seal around the aperture.

Immediately beneath the flange 12 the shank is formed with an external part-circumferential groove 13 which forms a part-annular shoulder 14 facing the flange 12. The shank is circumferentially continuous over the whole of its length and tapers from the shoulder 14 to its tip.

Two external axially extending ribs 15 and 16 are diametrically located on the external surface of the shank. The ribs 15 and 16 extend up to the flange but stop short of the tip of the shank. Internally the shank is formed with a pair of axially extending grooves 17 and 18 which extend into the ribs 15 and 16 respectively and which allow the shank to collapse radially.

The bore 11a of the tubular shank is flared outwardly at the flanged end of the shank to provide a lead-in for a screw or threaded rod, and over the remainder of the length of the shank is substantially cylindrical and plain, apart from the break formed by the grooves 17, 18.

The fastener is used in the manner of a self-threading bush to hold a screw 19 in a support panel 20 formed with an aperture 21. The apertured support 20 is shown in FIGURE 6 and the assembly in FIGURE 7.

The aperture 21 is part-circular and has a pair of diametrically positioned recesses 22 and 23 which are shaped to receive the ribs 15 and 16 of the fastener 10.

The diameter of the part-circular portion of the aperture 21 is slightly greater than the diameter of the groove 13 in the shank of the fastener and less than the maximum diameter of the shoulder 14.

Figure 7:
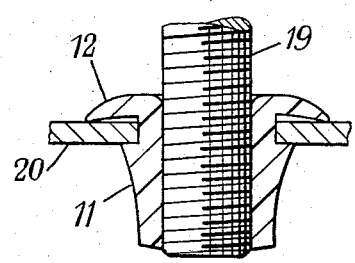

In order to make the assembly shown in FIGURE 7 the fastener 10 is pushed home into the aperture 21 until the shoulder 14 on the shank snaps through the support to retain the fastener in the aperture with the ribs located in the slots 22 and 23. The internal grooves 17 and 18 allow the shank to collapse so that the shoulder 14 can be forced into the aperture 21 without undue difficulty.

The screw 19 is then threaded down into the bore 11a of the tubular shank, which is held against rotation in the aperture 21 by the ribs 15 and 16 which lock in the recesses 22 and 23.

The diameter of the cylindrical portion of the bore 11a in the shank 11 is equal to the root diameter of the screw and thus as the screw is turned down into the fastener it cuts its own thread on the internal surface of the shank.

The resilience and the dished shape of the flange 12 allow the fastener to be securely engaged on panels having a wide range of thickness and it also allows a screw to be tilted away from the vertical, relative to the support panel 20 without lifting the fastener out of engagement in the aperture 21.

This last-mentioned feature enables the fastener 10 to be used with particular success as a bush or anchor nut for the angle adjustment screws of a vehicle headlamp reflector bowl.

It is normal practice to attach the reflector bowl to an annular support flange by three threaded bolts or screws. The screws are held against axial movement relative to the bowl but are free to rotate relative to the bowl. The projecting ends of the screws are threadedly engaged in apertures in the annular support and rotation of one of the screws into or out of its aperture in the support causes an angular adjustment of the bowl relative to the support. In order to achieve the necessary angular adjustment of the bowl the adjustment screws have to be angularly adjustable out of the vertical relative to the support within an imaginary cone having its centre coincident with the centre of the aperture in the support through which the screw extends and an apex angle of about 30°.

In the fastener 10 the resilience and dished shape of the flange 12 enable the screw 19 to be tilted away from the vertical to the extent referred to above without lifting the flange away from the panel 20 and without pulling the shoulder 14 through the aperture.

Figure 8:
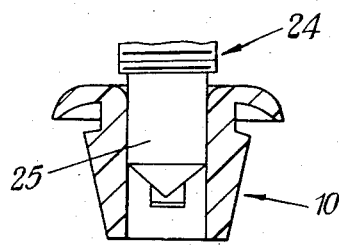

A screw of the type illustrated in FIGURE 8 at 24 may also be used with advantage in the fastener 10.

The screw 24 has a plain cylindrical tip 25 which is of such diameter that it is a light friction fit in the bore of the tubular shank 11. The screw 24 can thus be pressed into the fastener and is self-retaining before it is screwed fully home.

Figure 9:
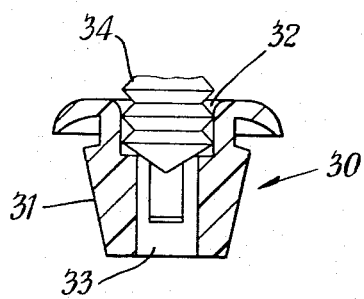

In a modification of the fastener 10, which is indicated at 30 in FIGURE 9, the fastener may be provided with a tubular shank 31 having a stepped bore 32, 33. Preferably the diameter of the outer bore 32 is equal to, or slightly less than, the crest diameter of a screw 34 to be engaged in the fastener and the diameter of the inner bore 33 is equal to the root diameter of the screw 34.

The screw 34 can thus be pressed into the outer bore 32 and lightly held therein before it is screwed down into tight thread-cutting engagement in the inner bore 33.

In all other respects the fastener 30 is similar to the fastener 10 and is used in the same manner and with the same advantages as the fastener 10.

Figure 10:
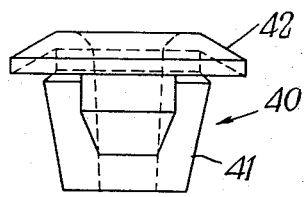
Figure 11:
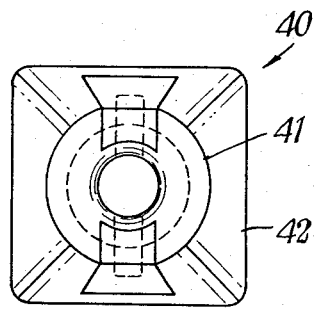

In a further modification of the fastener 10 which is indicated generally at 40 in FIGURES 10 and 11 a shank 41, which is identical in all other respects to the shank 11 of the fastener 10, is provided with a flange 42 at one end which is externally square.

The flange 42, which is resilient and dished towards the shank 41 so as to allow for tilting of a screw engaged in the shank, is externally square so as to facilitate automated handling of the fastener 40 during assembly operations.

In all other respects the fastener 40 is similar to the fastener 10 and is used in the same manner with the same advantageous results.

What I claim is:

A resilient fastener for holding a threaded member in a panel formed with a part circular aperture having oppositely extending recesses, the fastener comprising a tubular shank formed with two external lengthwise extending ribs which are locatable within the recesses in the aperture in the panel to prevent rotation of the fastener relative to the panel and internal grooves extending into the ribs and allowing the shank to collapse in a radial sense, a flange at one end of the shank having a dished undersurface adapted to press resiliently against a surface of the panel and an external part circumferential groove in the shank adjacent the flange, the groove forming a part annular shoulder facing the flange and adapted to cooperate with the flange in clamping the rim of the apertured panel, the shank being internally plainwalled prior to insertion of the threaded member into thread cutting engagement in the shank and the flange being sufficiently dished and resilient to allow substantial angular movement of the threaded member away from the vertical relative to the panel.

References Cited

UNITED STATES PATENTS

| 3,033,624 | 5/1962 | Biesecker | 85—82 X |
| 3,182,544 | 5/1965 | Rapata | 85—80 |
| 3,200,694 | 8/1965 | Rapata | 85—82 |
| 3,271,059 | 9/1966 | Pearson | 24—73 X |

FOREIGN PATENTS 996,455   6/1965   Great Britain.

WILLIAM FELDMAN, *Primary Examiner.*

E. SIMONSEN, *Assistant Examiner.*